Figures 1, 2, 3:
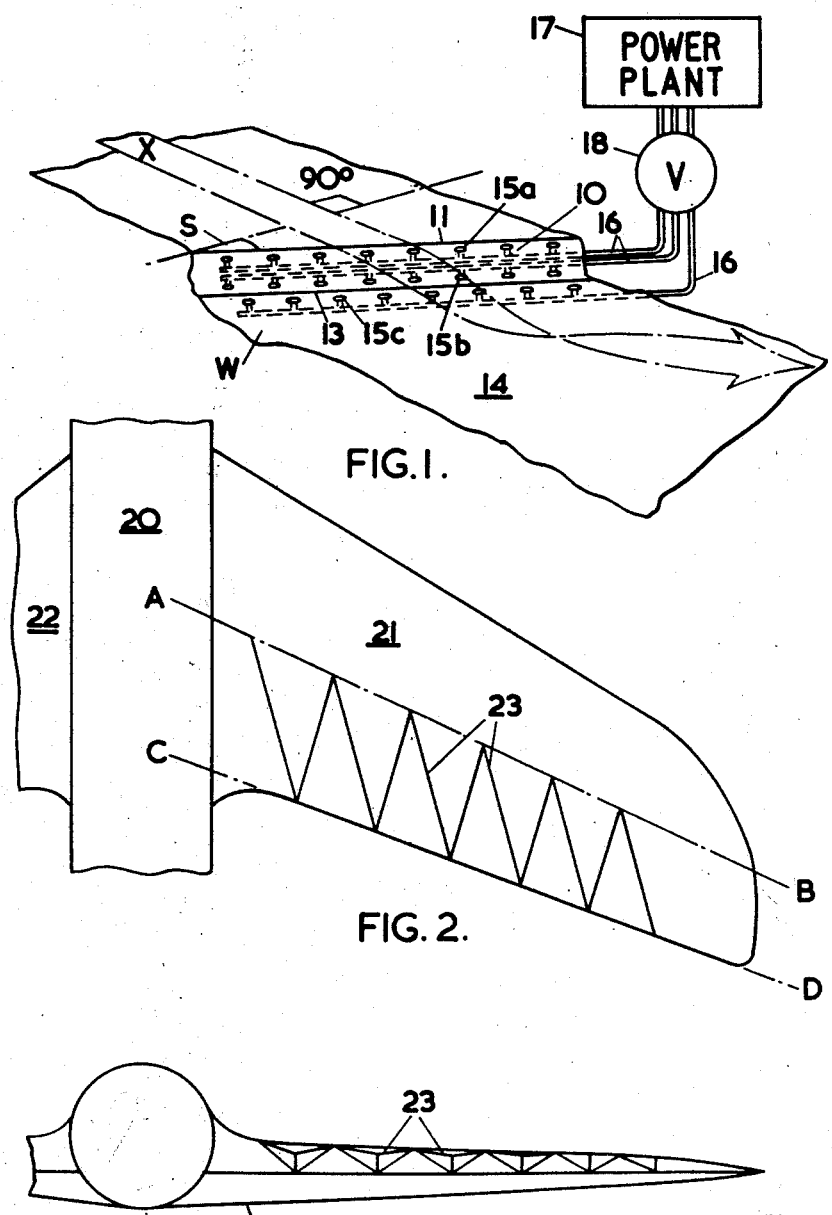

Jan. 8, 1963  J. SEDDON ET AL  3,072,368
HIGH SPEED AERODYNAMIC BODY
Filed Aug. 13, 1959  5 Sheets-Sheet 1

INVENTORS
JOHN SEDDON
LEO HAVERTY, DECEASED
BY EDNA VICTORIA HAVERTY, ADMINISTRATRIX

By
Attorneys

Jan. 8, 1963     J. SEDDON ET AL     3,072,368
HIGH SPEED AERODYNAMIC BODY
Filed Aug. 13, 1959     5 Sheets-Sheet 2

INVENTORS
JOHN SEDDON
LEO HAVERTY, DECEASED
BY EDNA VICTORIA HAVERTY, ADMINISTRATRIX

INVENTORS
JOHN SEDDON
LEO HAVERTY, DECEASED
BY EDNA VICTORIA. HAVERTY, ADMINISTRATRIX

Jan. 8, 1963  J. SEDDON ET AL  3,072,368
HIGH SPEED AERODYNAMIC BODY
Filed Aug. 13, 1959  5 Sheets-Sheet 4

INVENTORS
JOHN SEDDON
LEO HAVERTY, DECEASED
BY EDNA VICTORIA HAVERTY, ADMINISTRATRIX

By
Attorneys

INVENTORS
JOHN SEDDON
LEO HAVERTY, DECEASED
BY EDNA VICTORIA. HAVERTY, ADMINISTRATRIX

By
Attorneys

United States Patent Office 3,072,368
Patented Jan. 8, 1963

---

3,072,368
HIGH SPEED AERODYNAMIC BODY
John Seddon, Farnham, England, and Leo Haverty, deceased, late of Surrey, England, by Edna Victoria Haverty, administratrix, Sunbury-on-Thames, England, assignors to Power Jets (Research and Development) Limited, London, England, a British company
Filed Aug. 13, 1959, Ser. No. 833,410
Claims priority, application Great Britain Aug. 28, 1958
13 Claims. (Cl. 244—41)

This invention relates generally to aircraft, the term aircraft being applied in this specification to both winged and wingless craft capable of airborne flight.

Now it has hitherto been well known to provide on the wings of conventional relatively low speed aircraft means for modifying the air flow thereover for the purpose of giving the wing specific lift and drag generating characteristics: these means, for example, have taken the form of flaps, slots and air jets.

The present invention is concerned broadly with means for improving the lift and drag characteristics of aircraft capable of flight at relatively high speeds, that is at subsonic, supersonic and higher speeds.

According to the invention an aerodynamic surface of an aircraft is provided with a rearwardly facing wall or step, the edge of the wall or step at the junction with the surface being swept in relation to the normal free air stream direction or line of flight and the angle of inclination of the wall or step to a portion of the surface forward of the edge being such that the air flow separates from the surface at the edge.

The edge of the step may be straight.

Means may be provided for modifying the air flow over the edge, for example jets of air discharged from nozzles in the edge or a region adjacent the base of the wall or step, or by suction through outlets in the floor or riser of the step, the strength of the jet or suction being variable as required.

The depth of the wall or step may be varied progressively along the length of the wall or step and may in some cases be zero, for example at an extreme point.

In the case of a wing, a plurality of walls forming steps may be provided in the upper and/or lower surface and may be arranged so that they form pairs or series of contiguous steps. The steps may extend rearwardly chordwise from the approximate position of maximum thickness of the wing. The maximum depth of the riser may be equal to or greater than the maximum wing thickness, the depth exceeding the thickness when the edge of the riser and the floor of the step diverge rearwardly. The steps may terminate at, or be extended as projections aft of the trailing edge.

A wall or step riser may be the whole or part of a swept trailing edge of a wing.

In the case of an aircraft or component of generally cylindrical form, such as a rocket, or an aircraft fuselage or an engine nacelle, steps according to the invention may be built into the rear end region, which region may be annular or shaped to surround one or more propulsive jet nozzles as the case may be, or be a closed rear end surface.

In applying the invention to aircraft wings having embedded jet engines, the jet efflux nozzle may be located so that the risers of adjacent steps intersect or form the boundary of the engine cowling in the region of the trailing edge, whereby, especially in the case of a wing having a thick trailing edge, the drag due to protruding parts of the engine installation is minimised.

Figure 4:
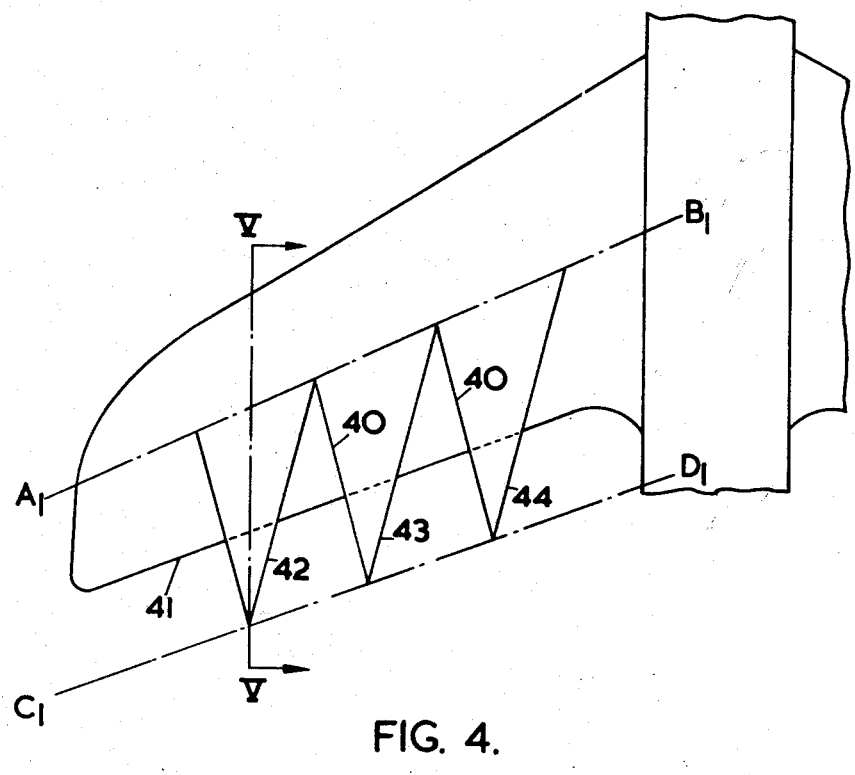
Figure 5:
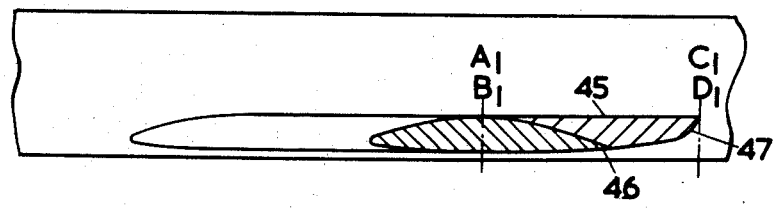
Figure 6:
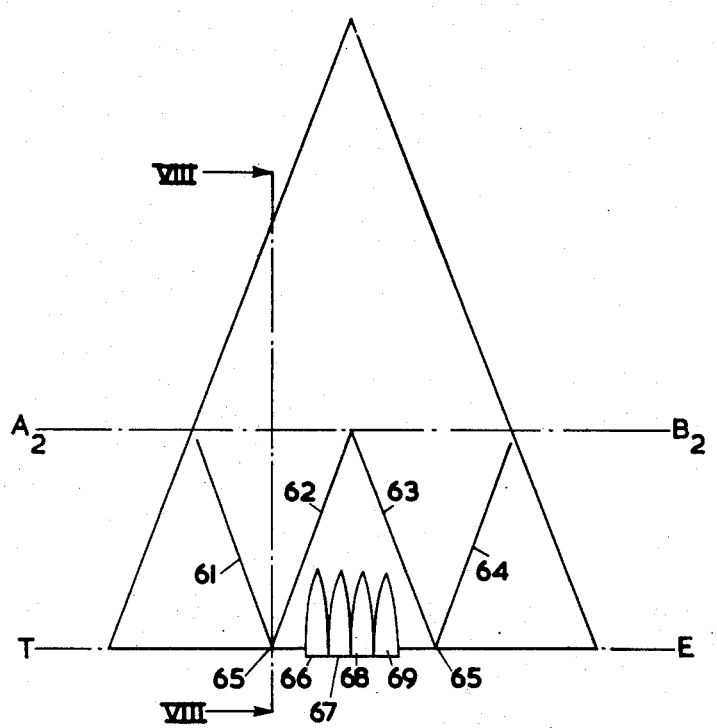
Figure 7:
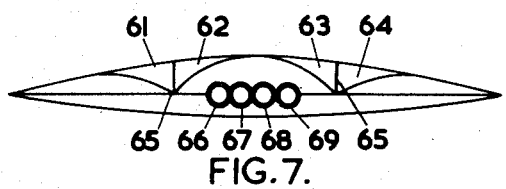
Figure 8:
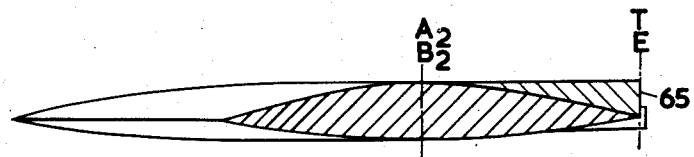
Figure 9:
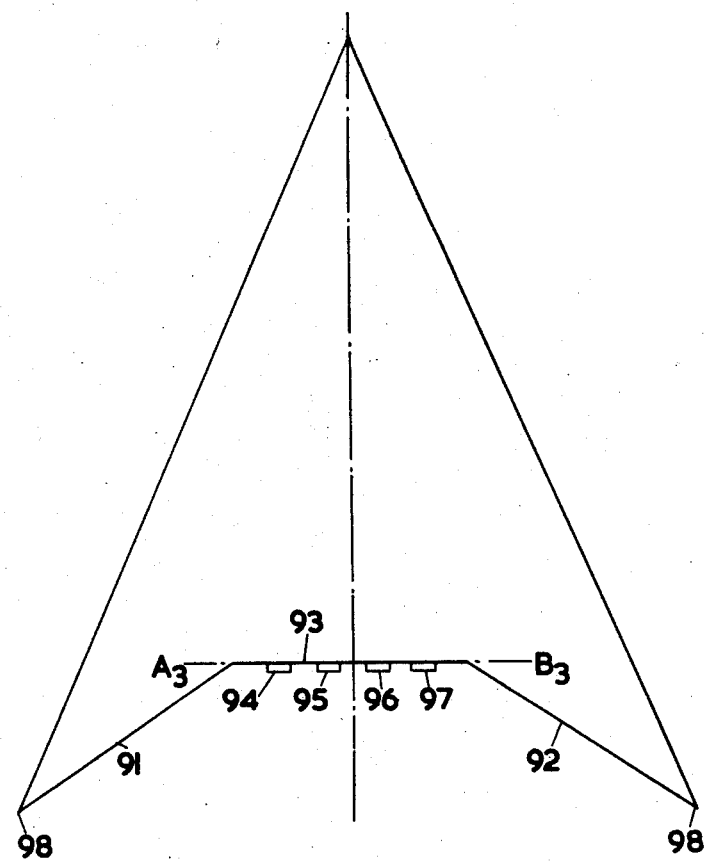
Figure 10:
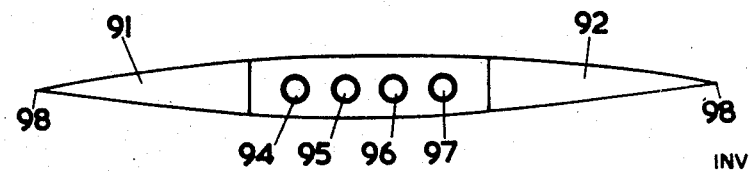

Several examples of the invention will now be described with reference to the accompanying diagrammatic drawings in which, FIGURE 1 illustrates to a large scale a typical simple step in accordance with the invention in a wing surface and the location of orifices through which air may be directed to influence the air flow over the step, FIGURES 2 and 3 are plan and rear views of an aircraft having a wing embodying one arrangement of steps, FIGURES 4 and 5 are plan and chordwise sectional views of an aircraft wing embodying rearwardly extending steps, FIGURES 6, 7 and 8 are plan and rear and longitudinal sectional views of a slender wing aircraft embodying another arrangement of steps, FIGURES 9 and 10 are plan and rear views of another form of slender wing aircraft having a swept trailing edge.

Figure 11:
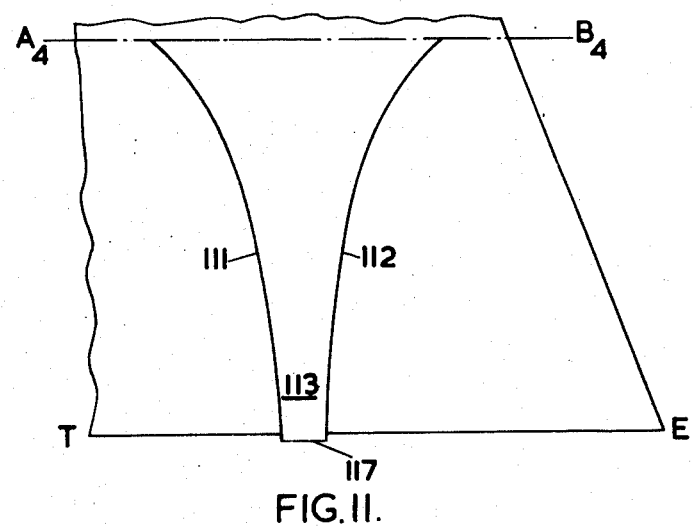
Figure 12:
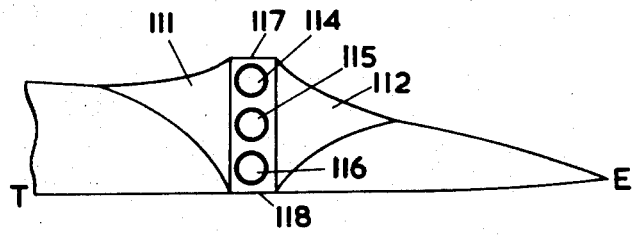
Figure 13:
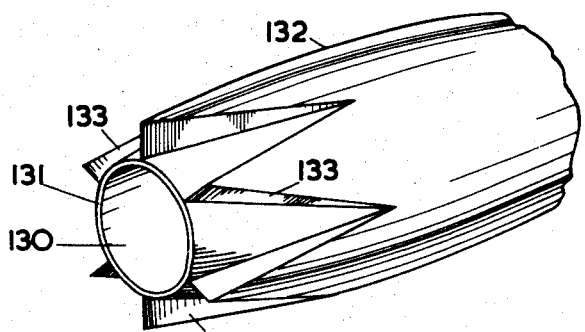

FIGURES 11 and 12 are rear and perspective views of a rear portion of a wing showing one way of housing several jet engines in the wing, and FIGURE 13 is a perspective view of the rear end of an engine nacelle embodying the invention.

In FIGURE 1 the air flow over a part of a wing W is shown by the arrow X. This flow is typical of the flow over the edge of a step having a riser 10 perpendicular to the wing surface ahead of the step and of which the edge 11 is swept back at an angle S of about 30°. In practice the angle S may lie in the range 15° to 85°. The aerodynamic effect of this flow over the step is to modify the pressure distribution on the step itself and downstream of the step. In general, at small to moderate values of angle S the drag of the step is reduced below that of a step swept at an angle $S=0°$ and at high values of angle S, in addition to a drag reduction, the distribution of lift over the surface downstream of the step is modified. Thus, the provision of a step swept at an angle in the aforesaid range provides a means of improving the aerodynamic characteristics of the surface. This figure also shows sets of nozzle orifices $15a$, $15b$ and $15c$ of which the set $15a$ is located at the edge of the step, the set $15b$ in the riser and close to the angle of the step and the set $15c$ in the floor and close to the angle of the step. These orifices are connected by conduits as indicated by the broken lines $16a$, $16b$ and $16c$ to power plant 17 operable to blow or suck air through the orifices, in response to the setting of control gear 18, for the purpose of influencing the air flow over the edge of the step and the extent or manner in which the step affects the aerodynamic characteristics of the wing surface.

In FIGURES 2 and 3 the aircraft shown has a fuselage 20 and thin wings 21, 22 each having swept back sharp edged leading and trailing edges. The upper surfaces of the wings have a series of adjacent steps as at 23 with risers perpendicular to the portion of wing surfaces ahead of the step i.e. at or forward of line A—B, which is the position of maximum thickness of the wing, and increasing in depth rearwardly from zero depth at line A—B to maximum depth at the trailing edge C—D.

The aircraft shown in FIGURES 4 and 5 is similar to that of FIGURES 2 and 3 but the steps 40 according to the invention extend from the line $A_1$—$B_1$ which is the position of maximum wing thickness, to as far as the trailing edge 41. Aft of the edge 41 the rearward face of the step is continued as a wall or a cliff face, the adjacent ones of which meet on the line $C_1$—$D_1$ thus forming the projections 42, 43 and 44. FIGURE 5 is a cross sectional view on the line V—V of the wing of FIGURE 4 and shows the sectional shape of the wing and projection 42, the upper surface 45 being flat over its whole length and the lower surface 46 being flat over part of its length and curving upwards as at 47 to meet the upper surface 45 on the line $C_1$—$D_1$. As shown in FIGURE 5 the depth of the rearwardly facing wall increases from zero at line $A_1$—$B_1$ to a maximum in the region of the trailing edge and decreases progressively to become zero at line $C_1$—$D_1$.

FIGURES 6, 7 and 8 show a slender wing aircraft of "delta" plan form, FIGURE 7 being a rear view of the aircraft and FIGURE 8 a longitudinal section on the line VIII—VIII of FIGURE 6.

The wing has four steps 61, 62, 63, 64 according to the invention extending from the line $A_2$—$B_2$, which is the position of maximum wing thickness, rearwardly to the trailing edge, T.E., the depth of the step being zero at the line $A_2$—$B_2$ and increasing progressively to a maximum at the trailing edge. As shown, the pairs of steps 61, 62 and 63, 64, meet at sharp vertical edges 65 which intersect the trailing edge. A bank of four jet engines is centrally housed at the rear of the aircraft, the jet nozzles 66, 67, 68 and 69 protruding slightly behind the trailing edge.

FIGURES 9 and 10 show plan and rear views of another form of slender wing aircraft of generally "delta" plan form, the trailing edge of the wing constituting the swept rearwardly facing wall at 91 and 92 and the centre section of the trailing edge 93 housing the jet nozzles 94, 95, 96 and 97 of four jet engines. The aircraft shown has its maximum wing thickness on the centre line and the depth of the wall in this special case is equal in depth to the wing thickness being of maximum depth at the forward position on the line $A_3$—$B_3$ and decreasing progressively to zero at the wing tips 98. The wall and the centre section constitute the thick swept trailing edge of the wing.

FIGURES 11 and 12 show respectively plan and rear views of an outboard portion of a slender wing, the wing having a pair of curved steps 111, 112 which extend rearwardly from the position of maximum wing thickness $A_4$—$B_4$ to the trailing edge T.E. The step risers are perpendicular to the upper wing surface and are of zero depth at the line $A_4$—$B_4$ and increase in depth to a maximum at the trailing edge T.E. At the trailing edge the risers form the vertical sides of a housing 113 in which three jet engines are mounted, the jet nozzles being shown at 114, 115, 116. The housing 113 is bounded at the top by a transverse edge 117 and at the bottom by a portion 118 of the trailing edge.

FIGURE 13 shows the rear end of an engine nacelle, the jet discharge nozzle terminating in an orifice 130 bounded by the jet pipe 131 which is enclosed by the housing 132. The housing comprises twelve adjacent steps as at 133 of which the risers of adjacent pairs intersect in a common plane transverse to the engine fore and aft axis and containing the rim of the nozzle. As shown, the depth of the risers increases gradually in a rearward direction.

Referring again to FIGURE 1 it will be apparent to those skilled in the art that by providing discharge nozzles at the edge 11 or in the face of the riser 10 or in the angle 13 of the step, air may be blown against the stream of air flowing over the edge to influence the flow characteristics. Likewise, orifices may be provided in the floor 14 of the step or, in some cases, in the angle 13, instead of discharge nozzles, through which orifices air may be sucked thereby influencing the flow in another manner in accordance with the particular result desired. Any or all of the methods of influencing the air flow over the step described in relation to FIGURE 1 may be applied to the constructions illustrated in FIGURES 2 to 13.

It is to be understood that the term "swept" includes forward and rearward sweep of the steps of the invention and of the aerodynamic members of which they may form part.

We claim:

1. A relatively high speed aerodynamic body having an aerodynamic surface, and a rearwardly facing wall joined to said aerodynamic surface at an angularly edged junction, said wall being inclined at a large angle to said surface and being of relatively large height measured normal to said surface with respect to the local boundary layer thickness whereby air flowing over said surface separates therefrom at said angularly edged junction, said wall being swept relative to the normal free air stream direction and extending continuously transversely over substantially all of said surface to bring about flow separation over a correspondingly large continuous spanwise region of said surface.

2. A body according to claim 1 in which the surface forms part of an aircraft wing and the maximum height of the wall is at least equal to half the maximum thickness of the wing.

3. A body according to claim 1 of which the surface forms part of a wing with a swept trailing edge and wherein the wall is the major portion of the edge, the depth of the wall thereby constituting the trailing edge thickness dimension over the swept region.

4. A body having a wing according to claim 2 in which the wall extends rearwardly from the approximate position of maximum thickness of the wing.

5. A body having a wing as recited in claim 2, said wing including a rearwardly directed projection extending aft of the trailing edge of said wing, said projection having upper and lower aerodynamic surfaces which are respectively aerodynamically continuous with the upper and lower aerodynamic surfaces of said wing, said wall having portions formed in that region of said projection aft of said trailing edge and connecting the upper with the lower surface of said projection.

6. A relatively high speed aerodynamic body having an aerodynamic surface, and a plurality of contiguous rearwardly facing walls, each of said walls being joined to said surface at an angularly edged junction, being inclined at a large angle to said surface, and being of a large height measured perpendicular to said surface relative to the local boundary layer thickness whereby air flowing over said surface separates therefrom at said junctions, each of said walls having an effective transverse dimension in the plane of said surface and approximately normal to the local free airstream flow direction equal to at least 5% of the total transverse dimension of said surface and being swept in relation to the flow direction, said walls being effectively contiguous to conjointly present a continuous angularly edged junction extending transversely over substantially all of said surface, thereby causing flow separation over a correspondingly large spanwise region of said surface.

7. A body according to claim 6 in which the surface forms part of an aircraft wing and the maximum height of each wall is at least equal to half the maximum thickness of the wing.

8. A body having a wing as recited in claim 7, said wing including a plurality of rearwardly directed projections extending aft of the trailed edge of said wing, each of said projections having upper and lower surfaces which are aerodynamically continuous with the upper and lower surfaces of said wing, respectively, said walls having portions formed in those regions of said projections which are aft of said trailing edge and connecting the upper with the lower surfaces of said projections.

9. A body according to claim 6 of which the surface forms part of a wing with a swept trailing edge in which the walls are substantially the whole of the trailing edge, the depth of the risers thereby constituting the trailing edge thickness dimension.

10. A body according to claim 6 in which the surface forms part of an aircraft wing and wherein each wall extends rearwardly from the approximate position of maximum thickness of the wing.

11. A body according to claim 6 of generally cylindrical form having nose and tail regions relative to the flight direction and in which the plurality of contiguous walls are arranged circumferentially of the tail region.

12. A body according to claim 11 comprising an annulus at the tail surrounding a central aperture and in which the contiguous walls are arranged around the annulus.

13. A body according to claim 12 comprising a propulsive engine from which a propulsive jet is discharged and wherein the engine is arranged to discharge the jet through the central aperture.

References Cited in the file of this patent

UNITED STATES PATENTS

| 1,746,140 | Bobo | Feb. 4, 1930 |
| 2,408,788 | Luddington | Oct. 8, 1946 |
| 2,562,227 | Lobel | July 31, 1951 |
| 2,800,291 | Stephens | July 23, 1957 |
| 2,844,337 | MacArthur | July 22, 1958 |

FOREIGN PATENTS

| 596,884 | France | Aug. 17, 1925 |